(12) United States Patent
Lim et al.

(10) Patent No.: US 11,901,529 B2
(45) Date of Patent: Feb. 13, 2024

(54) BATTERY MODULE

(71) Applicant: Samsung SDI Co., Ltd., Yongin-si (KR)

(72) Inventors: Jisoon Lim, Yongin-si (KR); Sungyong Kim, Yongin-si (KR); Jaeho Kim, Yongin-si (KR); Soodeok Moon, Yongin-si (KR); Daeyeop Park, Yongin-si (KR); Jangwoong Bae, Yongin-si (KR); Junhyung Lee, Yongin-si (KR); Dooyong Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 172 days.

(21) Appl. No.: 16/656,197

(22) Filed: Oct. 17, 2019

(65) Prior Publication Data

US 2020/0127344 A1  Apr. 23, 2020

(30) Foreign Application Priority Data

Oct. 19, 2018 (KR) .......... 10-2018-0125552

(51) Int. Cl.
*H01M 10/613* (2014.01)
*H01M 10/6557* (2014.01)
(Continued)

(52) U.S. Cl.
CPC ..... *H01M 10/613* (2015.04); *H01M 10/6557* (2015.04); *H01M 50/209* (2021.01);
(Continued)

(58) Field of Classification Search
CPC . H01M 50/20; H01M 10/613; H01M 10/6557
See application file for complete search history.

(56) References Cited

U.S. PATENT DOCUMENTS

| 6,146,778 A | 11/2000 | Rouillard et al. |
| 6,255,015 B1 | 7/2001 | Corrigan et al. |
| (Continued) | | |

FOREIGN PATENT DOCUMENTS

| CN | 1324499 A | 11/2001 |
| CN | 1592977 A | 3/2005 |
| (Continued) | | |

OTHER PUBLICATIONS

U.S. Office Action dated Jun. 28, 2021, issued in U.S. Appl. No. 16/655,889 (9 pages).

(Continued)

*Primary Examiner* — Jonathan G Jelsma
(74) *Attorney, Agent, or Firm* — Lewis Roca Rothgerber Christie LLP

(57) ABSTRACT

A battery module includes a cell stack in which a plurality of unit cells are aligned in a first direction and including an insulating member surrounding the plurality of unit cells; and a module housing in which a plurality of receiving parts into which the cell stack is inserted are provided, wherein the receiving part includes a fixing wall surrounding the cell stack and having at least a portion which is in contact with the cell stack.

16 Claims, 6 Drawing Sheets

(51) Int. Cl.
  *H01M 50/289*  (2021.01)
  *H01M 50/209*  (2021.01)
  *H01M 50/242*  (2021.01)
  *H01M 50/264*  (2021.01)
  *H01M 50/503*  (2021.01)
  *H01M 50/51*  (2021.01)

(52) U.S. Cl.
  CPC ....... *H01M 50/242* (2021.01); *H01M 50/264* (2021.01); *H01M 50/289* (2021.01); *H01M 50/503* (2021.01); *H01M 50/51* (2021.01)

(56) References Cited

U.S. PATENT DOCUMENTS

| | | | |
|---|---|---|---|
| 6,555,264 | B1 | 4/2003 | Hamada et al. |
| 6,864,013 | B2 | 3/2005 | Gow et al. |
| 2005/0079408 | A1 | 4/2005 | Hirano |
| 2005/0255379 | A1 | 11/2005 | Marchio et al. |
| 2007/0054561 | A1 | 3/2007 | Gutman et al. |
| 2007/0087266 | A1 | 4/2007 | Bourke et al. |
| 2010/0009251 | A1 | 1/2010 | Shin et al. |
| 2010/0266887 | A1 | 10/2010 | Sekino et al. |
| 2010/0285347 | A1 | 11/2010 | Saito et al. |
| 2011/0165451 | A1 | 7/2011 | Kim et al. |
| 2011/0300433 | A1 | 12/2011 | Kim |
| 2012/0103714 | A1* | 5/2012 | Choi ................. B60L 58/40 180/68.5 |
| 2012/0115013 | A1 | 5/2012 | Kim et al. |
| 2012/0177970 | A1 | 7/2012 | Marchio et al. |
| 2013/0045403 | A1 | 2/2013 | Shin et al. |
| 2013/0089763 | A1 | 4/2013 | Lee |
| 2013/0207459 | A1 | 8/2013 | Schröder et al. |
| 2013/0260195 | A1 | 10/2013 | Long |
| 2014/0087221 | A1 | 3/2014 | Kim et al. |
| 2014/0141311 | A1 | 5/2014 | Michelitsch |
| 2014/0234690 | A1 | 8/2014 | Le et al. |
| 2014/0353057 | A1 | 12/2014 | Adachi |
| 2015/0042158 | A1 | 2/2015 | Schmidt et al. |
| 2015/0072178 | A1 | 3/2015 | Gu |
| 2015/0229010 | A1 | 8/2015 | Ahn |
| 2015/0357617 | A1 | 12/2015 | Okada |
| 2016/0028056 | A1 | 1/2016 | Lee et al. |
| 2016/0056427 | A1 | 2/2016 | Kim et al. |
| 2016/0118635 | A1 | 4/2016 | Keller et al. |
| 2016/0164054 | A1 | 6/2016 | Yamamoto et al. |
| 2016/0233464 | A1 | 8/2016 | Nusier et al. |
| 2016/0233468 | A1 | 8/2016 | Nusier et al. |
| 2016/0268657 | A1* | 9/2016 | Park .................... H01M 10/613 |
| 2017/0062783 | A1 | 3/2017 | Kim et al. |
| 2017/0062789 | A1 | 3/2017 | Sim et al. |
| 2017/0133706 | A1 | 5/2017 | Ejima |
| 2017/0222200 | A1 | 8/2017 | Murai et al. |
| 2017/0263910 | A1 | 9/2017 | Kobayashi et al. |
| 2017/0365888 | A1 | 12/2017 | Kwon et al. |
| 2018/0013111 | A1 | 1/2018 | Wuensche et al. |
| 2018/0026243 | A1 | 1/2018 | Stojanovic et al. |
| 2018/0102576 | A1 | 4/2018 | Yamamoto et al. |
| 2018/0109016 | A1 | 4/2018 | Fees et al. |
| 2018/0123200 | A1 | 5/2018 | Golubkov |
| 2018/0138466 | A1 | 5/2018 | Fees et al. |
| 2018/0138473 | A1 | 5/2018 | Bessho et al. |
| 2018/0138560 | A1 | 5/2018 | Bessho |
| 2018/0175466 | A1 | 6/2018 | Seo et al. |
| 2018/0269443 | A1 | 9/2018 | Takahashi et al. |
| 2018/0294452 | A1 | 10/2018 | Tan et al. |
| 2018/0331402 | A1 | 11/2018 | Inoue |
| 2018/0337374 | A1* | 11/2018 | Matecki ................. B60K 1/04 |
| 2019/0001838 | A1 | 1/2019 | Choi et al. |
| 2019/0088911 | A1 | 3/2019 | Peng et al. |
| 2019/0123318 | A1 | 4/2019 | Fees et al. |
| 2019/0198845 | A1 | 6/2019 | Bae et al. |
| 2019/0221817 | A1 | 7/2019 | Jeon |
| 2019/0296294 | A1 | 9/2019 | Hirschbeck et al. |
| 2019/0305273 | A1 | 10/2019 | Long et al. |
| 2019/0348725 | A1 | 11/2019 | Golubkov |
| 2020/0006824 | A1 | 1/2020 | Lim |
| 2020/0067155 | A1 | 2/2020 | Hwang et al. |
| 2020/0127258 | A1 | 4/2020 | Lim et al. |
| 2020/0313128 | A1 | 10/2020 | Schnakenberg |
| 2021/0143505 | A1 | 5/2021 | Hidaka |

FOREIGN PATENT DOCUMENTS

| | | | | |
|---|---|---|---|---|
| CN | 102117930 | A | 7/2011 | |
| CN | 102270754 | A | 12/2011 | |
| CN | 102934254 | A | 2/2013 | |
| CN | 103035975 | A | 4/2013 | |
| CN | 103380511 | A | 10/2013 | |
| CN | 103890997 | A | 6/2014 | |
| CN | 104137294 | A | 11/2014 | |
| CN | 104617244 | A * | 5/2015 | .......... H01M 2/1077 |
| CN | 104835980 | A | 8/2015 | |
| CN | 104904033 | A | 9/2015 | |
| CN | 104995760 | A | 10/2015 | |
| CN | 105552261 | A | 5/2016 | |
| CN | 105870370 | A | 8/2016 | |
| CN | 205768594 | U | 12/2016 | |
| CN | 106299176 | A | 1/2017 | |
| CN | 106486622 | A | 3/2017 | |
| CN | 106797005 | A | 5/2017 | |
| CN | 206210887 | U | 5/2017 | |
| CN | 206584990 | U | 10/2017 | |
| CN | 107528019 | A | 12/2017 | |
| CN | 107591500 | A | 1/2018 | |
| CN | 107644960 | A | 1/2018 | |
| CN | 107658401 | A | 2/2018 | |
| CN | 207199697 | U | 4/2018 | |
| CN | 207398218 | U | 5/2018 | |
| CN | 108365156 | A | 8/2018 | |
| CN | 108463902 | A | 8/2018 | |
| CN | 207690855 | U | 8/2018 | |
| CN | 207818706 | U | 9/2018 | |
| CN | 108630851 | A | 10/2018 | |
| CN | 210628373 | U | 5/2020 | |
| EP | 2450990 | A2 | 5/2012 | |
| EP | 2 608 309 | A1 | 6/2013 | |
| EP | 3 273 500 | A1 | 1/2018 | |
| EP | 3267507 | A1 | 1/2018 | |
| EP | 3 316 340 | A1 | 5/2018 | |
| EP | 3 327 817 | A1 | 5/2018 | |
| JP | 2003-249202 | A | 9/2003 | |
| JP | 2004-171856 | A | 6/2004 | |
| JP | 3906706 | B2 | 4/2007 | |
| JP | 2009-231042 | A | 10/2009 | |
| JP | 2013-8521 | A | 1/2013 | |
| JP | 2017-37754 | A | 2/2017 | |
| JP | 6095813 | B2 | 3/2017 | |
| JP | 6117308 | B2 | 4/2017 | |
| JP | 6224321 | B2 | 11/2017 | |
| JP | 2018-073551 | A | 5/2018 | |
| KR | 10-2010-0055477 | A | 5/2010 | |
| KR | 10-2013-0001381 | A | 1/2013 | |
| KR | 10-2013-0078933 | A | 7/2013 | |
| KR | 10-2013-0113740 | A | 10/2013 | |
| KR | 10-2015-0029371 | A | 3/2015 | |
| KR | 10-1584295 | B1 | 1/2016 | |
| KR | 10-2016-0037542 | A | 4/2016 | |
| KR | 10-2017-0011212 | A | 2/2017 | |
| KR | 10-2017-0025074 | A | 3/2017 | |
| KR | 10-2017-0053429 | A | 5/2017 | |
| KR | 10-2018-0010989 | A | 1/2018 | |
| KR | 10-2018-0045840 | A | 5/2018 | |
| KR | 10-2018-0054382 | A | 5/2018 | |
| KR | 10-2018-0060997 | A | 6/2018 | |
| KR | 10-2019-0079367 | A | 7/2019 | |
| WO | WO 00/11730 | A1 | 3/2000 | |
| WO | WO 2007/027603 | A2 | 3/2007 | |
| WO | WO 2016/166972 | A1 | 10/2016 | |
| WO | WO 2017/132575 | A1 | 8/2017 | |
| WO | WO 2017/203911 | A1 | 11/2017 | |
| WO | WO 2017/220515 | A1 | 12/2017 | |
| WO | WO 2018/016816 | A1 | 1/2018 | |

(56) References Cited

FOREIGN PATENT DOCUMENTS

| WO | WO 2018/062869 A1 | 4/2018 |
|---|---|---|
| WO | WO 2018/105981 A1 | 6/2018 |
| WO | 2018/142809 A1 | 8/2018 |

OTHER PUBLICATIONS

U.S. Final Office Action dated Jun. 29, 2021, issued in U.S. Appl. No. 16/656,324 (15 pages).
U.S. Office Action dated Jul. 7, 2021, issued in U.S. Appl. No. 16/656,099 (9 pages).
EPO Extended Search Report dated Mar. 4, 2020, corresponding to European Patent Application No. 19203926.1 (7 pages).
U.S. Office Action dated Sep. 1, 2021, issued in U.S. Appl. No. 16/656,406 (10 pages).
U.S. Advisory Action dated Sep. 2, 2021, issued in U.S. Appl. No. 16/656,324 (3 pages).
S. Office Action dated Mar. 17, 2021, issued in U.S. Appl. No. 16/656,324 (17 pages).
Extended European Search Report for corresponding European Patent Application No. 19203933.7, dated Feb. 20, 2020, 10 pages.
Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
U.S. Notice of Allowance dated Nov. 16, 2021, issued in U.S. Appl. No. 16/656,099 (9 pages).
U.S. Office Action dated Nov. 29, 2021, issued in U.S. Appl. No. 16/656,190 (15 pages).
U.S. Advisory Action from U.S. Appl. No. 16/655,889, dated Feb. 10, 2022, 3 pages.
U.S. Notice of Allowance from U.S. Appl. No. 16/656,099, dated Mar. 9, 2022, 9 pages.
U.S. Office Action from U.S. Appl. No. 16/656,406, dated Feb. 25, 2022, 9 pages.
Chinese Office Action, with English translation, dated Dec. 2, 2021, issued in corresponding Chinese Patent Application No. 201910988939.6 (22 pages).
Chinese Office Action, with English translation, dated Dec. 3, 2021, issued in Chinese Patent Application No. 201910989674.1 (23 pages).
Chinese Office Action, with English translation, dated Dec. 21, 2021, issued in Chinese Patent Application No. 201910989914.8 (18 pages).
Chinese Office Action, with English translation, dated Dec. 23, 2021, issued in Chinese Patent Application No. 201910990468.2 (15 pages).
Chinese Office Action, with English translation, dated Dec. 24, 2021, issued in Chinese Patent Application No. 201910988354.4 (21 pages).
Chinese Office Action, with English translation, dated Dec. 28, 2021, issued in Chinese Patent Application No. 201910989841.2 (16 pages).
U.S. Notice of Allowance dated Jan. 10, 2022, issued in U.S. Appl. No. 16/656,324 (8 pages).
U.S. Final Office Action dated Dec. 17, 2021, issued in U.S. Appl. No. 16/655,889 (8 pages).
Chinese Office Action dated Jun. 15, 2022, issued in Chinese Patent Application No. 201910988939.6 (9 pages).
Chinese Notice of Allowance dated Jun. 15, 2022, issued in corresponding Chinese Patent Application No. 201910989841.2 (7 pages).
U.S. Notice of Allowance from U.S. Appl. No. 16/655,889, dated Apr. 18, 2022, 8 pages.
U.S. Notice of Allowance from U.S. Appl. No. 16/656,324, dated May 4, 2022, 11 pages.
U.S. Office Action from U.S. Appl. No. 16/656,406, dated May 4, 2022, 9 pages.
U.S. Office Action from U.S. Appl. No. 16/656,190, dated May 19, 2022, 17 pages.
U.S. Notice of Allowance dated Jun. 28, 2022, issued in U.S. Appl. No. 16/656,324, 7 pages.
Espacenet Machine English translation of CN 104617244 A, previously cited in the Apr. 27, 2022 Final Office Action issued in U.S. Appl. No. 16/656,197, 18 pages.
U.S. Notice of Allowance dated Jul. 20, 2022, issued in U.S. Appl. No. 16/656,324 (11 pages).
U.S. Notice of Allowance dated Jul. 25, 2022, issued in U.S. Appl. No. 16/656,099 (9 pages).
Chinese Notice of Allowance, with English translation, dated Jul. 25, 2022, issued in Chinese Patent Application No. 201910988354.4 (6 pages).
Chinese Office Action, with English translation, dated Jul. 22, 2022, issued in Chinese Patent Application No. 201910989674.1 (19 pages).
EPO Office Action dated Jul. 26, 2022, issued in European Patent Application No. 19203930.3 (5 pages).
U.S. Notice of Allowance dated Nov. 22, 2022, issued in U.S. Appl. No. 16/656,099 (9 pages).
U.S. Notice of Allowance dated Dec. 7, 2022, issued in U.S. Appl. No. 16/656,406 (5 pages).
U.S. Notice of Allowance dated Dec. 7, 2022, issued in U.S. Appl. No. 16/656,324 (8 pages).
Chinese Notice of Allowance, with English translation, dated Nov. 4, 2022, issued in Chinese Patent Application No. 201910990468.2 (6 pages).
U.S. Office Action dated Feb. 7, 2023, issued in U.S. Appl. No. 16/655,889 (8 pages).
U.S. Notice of Allowance dated Aug. 11, 2022, issued in U.S. Appl. No. 16/655,889 (8 pages).
U.S. Notice of Allowance dated Aug. 17, 2022, issued in U.S. Appl. No. 16/656,406 (5 pages).
U.S. Office Action dated Sep. 23, 2022, issued in U.S. Appl. No. 16/656,190 (22 pages).
Chinese Office Acton, with English translation, dated Aug. 3, 2022, issued in Chinese Patent Application No. 201910990468.2 (27 pages).
EPO Office Action dated Aug. 5, 2022, issued in European Patent Application No. 19203939.4 (4 pages).
EPO Office Action dated Sep. 1, 2022, issued in European Patent Application No. 19203935.2 (4 pages).
U.S. Final Office Action dated Mar. 20, 2023, issued in U.S. Appl. No. 16/656,190 (20 pages).
EPO Extended European Search Report dated May 2, 2023, issued in European Patent Application No. 23150872.2 (7 pages).
Korean Office Action dated May 31, 2023, issued in Korean Patent Application No. 10-2018-0125549 (6 pages).
Korean Office Action dated Jun. 20, 2023, issued in Korean Patent Application No. 10-2018-0125553 (6 pages).
Korean Office Action dated Jun. 20, 2023, issued in Korean Patent Application No. 10-2018-0125552 (5 pages).
Korean Office Action dated Jun. 20, 2023, issued in Korean Patent Application No. 10-2018-0125551 (6 pages).
Korean Office Action dated Jun. 20, 2023, issued in Korean Patent Application No. 10-2018-0125550 (7 pages).
U.S. Office Action dated Jul. 11, 2023, issued in U.S. Appl. No. 18/184,637 (6 pages).
Chinese Notice of Allowance, with English translation, dated Jul. 10, 2023, issued in Chinese Patent Application No. 201910989674.1 (9 pages).

\* cited by examiner

BATTERY MODULE

CROSS-REFERENCE TO RELATED APPLICATIONS

This application claims priority to and the benefit of Korean Patent Application No. 10-2018-012552 filed in the Korean Intellectual Property Office on Oct. 19, 2018, the entire content of which is incorporated herein by reference. This application incorporates, in their entirety, by reference U.S. Application Ser. No. 16/656,190 filed on Oct. 17, 2019, U.S. application Ser. No. 16/656,324 filed on Oct. 17, 2019, U.S. application Ser. No. 16/655,889 filed on Oct. 17, 2019, U.S. application Ser. No. 16/656,406 filed on Oct. 17, 2019, and U.S. application Ser. No. 16/656,099 filed on Oct. 17, 2019.

BACKGROUND

1. Field

The present invention relates to a battery module, and more particularly, to a large module of a battery including a plurality of cell stacks each including a plurality of unit cells.

2. Description of the Related Art

Rechargeable batteries or secondary batteries differ from primary batteries in that charging and discharging may be repeated, whereas primary batteries typically provide irreversible conversion from chemical material to electrical energy. A low-capacity rechargeable battery may be used as a power source for small electronic devices such as a cellular phone, a notebook, a computer, and a camcorder, and a large-capacity rechargeable battery may be used as a power source for a hybrid vehicle or the like.

A secondary battery may include an electrode assembly including a cathode, an anode, and a separator interposed between the cathode and the anode, a case accommodating the electrode assembly, and an electrode terminal electrically connected to the electrode assembly.

An electrolytic solution may be injected into the case to enable charging and discharging of the battery by an electrochemical reaction of the cathode, the anode, and the electrolytic solution. For example, a shape of the case may be a cylindrical shape or a rectangular shape, which may be different depending on the use of the battery.

The rechargeable battery may be used in the form of a cell stack including a plurality of unit cells which are coupled in series with or in parallel to each other, thereby providing high energy density for driving of a hybrid vehicle, for example.

With the development of technology, an amount of electric power required for an electric vehicle (EV), a hybrid electric vehicle (HEV) and other electric energy consumption devices has increased, and a plurality of battery modules may be provided to satisfy the amount of electric power.

Therefore, the development of a new module structure that may simplify the components, effectively reduce the manufacturing cost and weight, and enable the manufacturing process to proceed efficiently while providing a plurality of cell stacks capable of meeting the required power of the electric energy consuming device is an important task.

SUMMARY

The present invention has been made in an effort to provide a battery module having an improved amount of electric power, and to efficiently improve the manufacturing process while simplifying components.

An exemplary embodiment according to the present disclosure provides a battery module. The battery module includes a cell stack comprising a plurality of unit cells aligned in a first direction and an insulating member around the plurality of unit cells; and a module housing having a plurality of receiving parts, the cell stack being in a receiving part of the plurality of receiving parts, wherein the receiving part comprises a fixing wall around the cell stack and having at least a portion in contact with the cell stack.

In some embodiments, the module housing includes a separation wall extending in the first direction and partitioning an inner space defined by an outer wall of the module housing to form the plurality of receiving parts, first and second receiving parts of the plurality of receiving parts are at opposite sides of the separation wall in a second direction perpendicular to the first direction, and the separation wall corresponds to a portion of the fixing wall of each of the first and second receiving parts and is in contact with a side surface of the cell stack.

In some embodiments, the module housing includes end walls at respective sides of each of the plurality of receiving parts in the first direction to engage end surfaces at respective sides of the cell stack in the first direction, and an end wall of the end walls corresponds to a portion of the fixing wall.

In some embodiments, the end walls, the separation wall, and the outer wall of the module housing are integral with a bottom surface of the module housing.

In some embodiments, one surface of the end wall faces the outer wall of the module housing and is spaced apart from the outer wall along the first direction to form a first impact absorbing space between the end wall and the outer wall.

In some embodiments, the plurality of receiving parts are in the inner space of the module housing, the first receiving part and a third receiving part are adjacent to each other along the first direction, and the end walls of the first and third receiving parts facing in the first direction and between the first and second receiving parts are spaced apart from each other to form a second impact absorbing space between the end walls.

In some embodiments, the module housing includes a cooling channel for a coolant to flow through, and located below a bottom surface of the module housing.

In some embodiments, a side wall of the cooling channel is integral with the bottom surface of the module housing.

In some embodiments, the battery module further includes coupling parts configured to couple the module housing to an adjacent module housing.

In some embodiments, the coupling parts are on a first wall and a second wall of the outer wall of the module housing that are positioned in a second direction perpendicular to the first direction, and the coupling part on the second wall of the module housing is coupled to a coupling part on a first wall of an adjacent module housing.

Another exemplary embodiment according to the present disclosure provides a battery pack. The battery pack includes a plurality of modules. Each module of the plurality of modules includes a cell stack comprising a plurality of unit cells aligned in a first direction and an insulating member around the plurality of unit cells; and a module housing having a plurality of receiving parts, the cell stack being in a receiving part of the plurality of receiving parts, wherein the receiving part comprises a fixing wall around the cell stack and having at least a portion in contact with the cell stack.

In some embodiments, the module housing comprises a separation wall extending in the first direction and partitioning an inner space defined by an outer wall of the module housing to form the plurality of receiving parts, first and second receiving parts of the plurality of receiving parts are at opposite sides of the separation wall in a second direction perpendicular to the first direction, and the separation wall corresponds to a portion of the fixing wall of each of the first and second receiving parts and is in contact with a side surface of the cell stack.

In some embodiments, the module housing comprises end walls at respective sides of each of the plurality of receiving parts in the first direction to engage end surfaces at respective sides of the cell stack in the first direction, and an end wall of the end walls corresponds to a portion of the fixing wall.

In some embodiments, the end walls, the separation wall, and the outer wall of the module housing are integral with a bottom surface of the module housing.

In some embodiments, one surface of the end wall faces the outer wall of the module housing and is spaced apart from the outer wall along the first direction to form a first impact absorbing space between the end wall and the outer wall.

In some embodiments, the plurality of receiving parts are in the inner space of the module housing, the first receiving part and a third receiving part are adjacent to each other along the first direction, and the end walls of the first and third receiving parts facing in the first direction and between the first and second receiving parts are spaced apart from each other to form a second impact absorbing space between the end walls.

In some embodiments, the module housing comprises a cooling channel for a coolant to flow through, and located below a bottom surface of the module housing.

In some embodiments, a side wall of the cooling channel is integral with the bottom surface of the module housing.

In some embodiments, the battery pack further includes coupling parts configured to couple the module housing of the module to a module housing of an adjacent module of the plurality of modules.

In some embodiments, the coupling parts are on a first wall and a second wall of the outer wall of the module housing that are positioned in a second direction perpendicular to the first direction, and the coupling part on the second wall of the module housing is coupled to a coupling part on a first wall of an adjacent module housing of the adjacent module. According to an embodiment of the present invention, the amount of electric power provided by a battery may be effectively improved, and the manufacturing process may be efficiently improved while simplifying the components.

The above and other aspects of the present disclosure will become more apparent to those skilled in the art from the following detailed description of the example embodiments with reference to the accompanying drawings.

DETAILED DESCRIPTION

Figure 1:
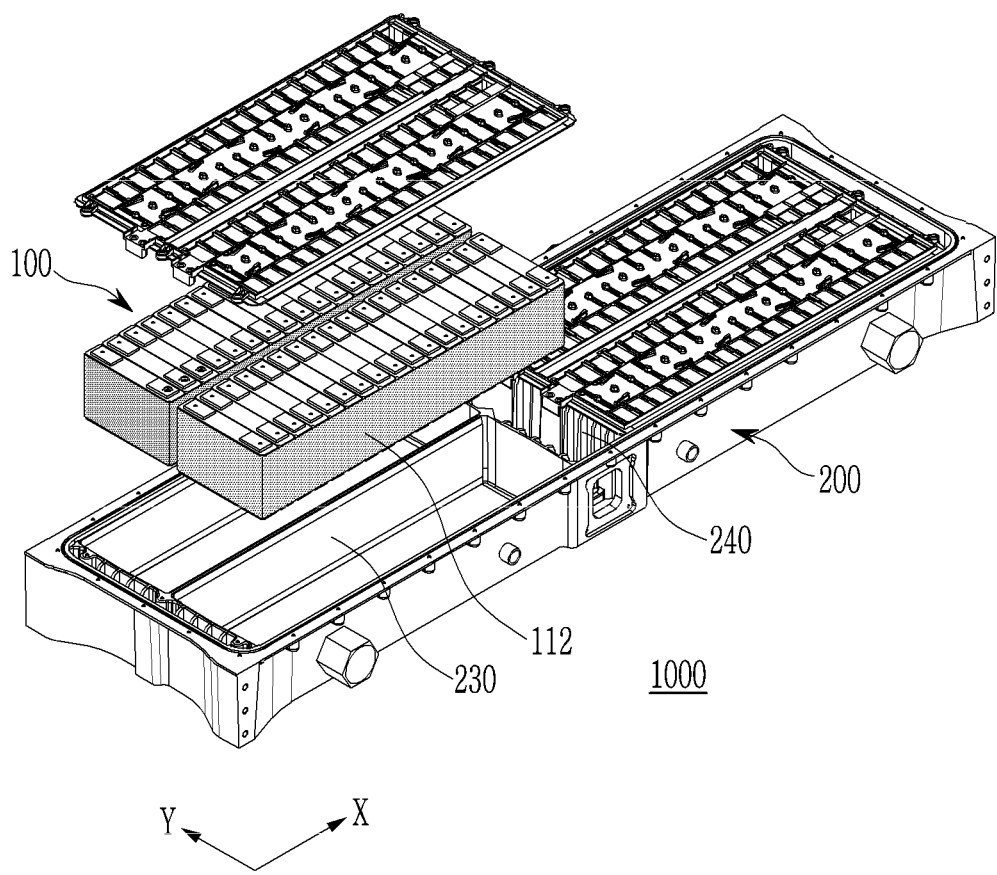
FIG. 1 is a view illustrating a battery module according to an exemplary embodiment of the present disclosure.

In the following detailed description, only certain exemplary embodiments according to the present invention have been shown and described, simply by way of illustration.

As those skilled in the art would realize, the described embodiments may be modified in various different ways, all without departing from the spirit or scope of the present invention. Accordingly, the drawings and the description are to be regarded as illustrative in nature and not restrictive. Like reference numerals designate like elements throughout the specification.

In the present specification, repeated description for the same components may be omitted.

Further, in the present specification, it is to be understood that when one component is referred to as being 'connected to' another component, it may be connected directly to the other component or be connected to the other component with an additional component interposed therebetween. On the other hand, in the present specification, it is to be understood that when one component is referred to as being 'directly connected to' another component, it may be connected to the other component without any other component interposed therebetween.

In addition, terms used in the present specification are used in order to describe specific exemplary embodiments rather than limiting the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Further, in the present specification, the term 'and/or' includes a combination of a plurality of stated items or any one of the plurality of stated items. In the present specification, 'A or B' may include 'A', 'B', or 'both of A and B'.

Figure 2:
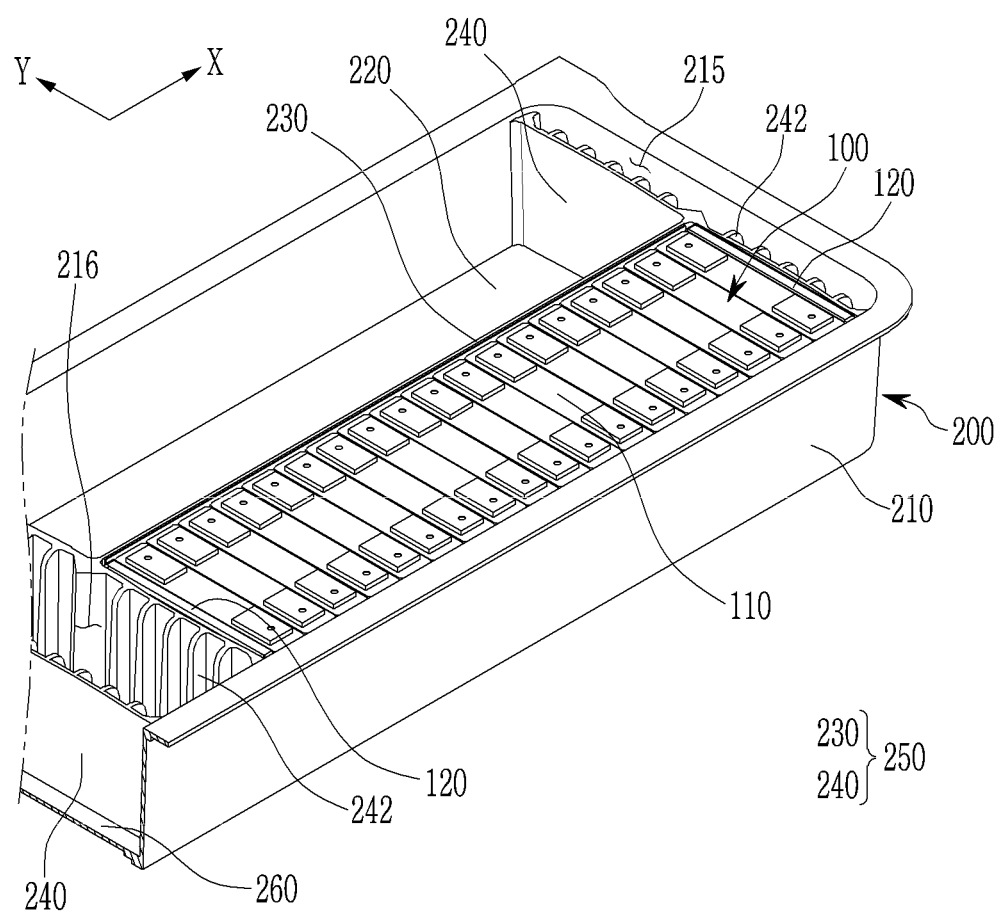
FIG. 2 is a view illustrating a receiving part in the battery module according to an exemplary embodiment of the present disclosure.

FIG. 1 illustrates a battery module 1000 according to an exemplary embodiment of the present disclosure, and FIG. 2 illustrates a view illustrating a receiving part 220.

As illustrated in FIGS. 1 and 2, the battery module 1000 according to an exemplary embodiment of the present disclosure includes a cell stack 100 in which a plurality of unit cells 110 are aligned in (e.g., arranged along) a first direction X and including an insulating member 112 around (e.g., surrounding) the plurality of unit cells 110, and a module housing 200 in which a plurality of receiving parts 220 into which the cell stack 100 is inserted are provided, wherein the receiving part 220 includes a fixing wall 250 around (e.g., surrounding) the cell stack 100 and having at least a portion which is in contact with the cell stack 100.

The cell stack 100 includes the plurality of unit cells 110 aligned in the first direction X. The unit cell 110 may include an electrode assembly, correspond to one secondary battery including a terminal part, and include a case having one of various shapes such as a rectangular shape, a cylindrical shape, or the like.

FIGS. 1 and 2 illustrate the unit cell 110 having a case having a rectangular shape (e.g, a rectangular pillar shape), but the unit cell 110 is not necessarily limited thereto. However, for convenience of explanation, the unit cell 110 will hereinafter be described as having the case with the rectangular shape illustrated in FIGS. 1 and 2.

The plurality of unit cells 110 are aligned in the cell stack 100, and there may be different suitable alignment directions of the unit cells 110 various embodiments. In some embodiments, the unit cells 110 may be aligned in a direction in which wide side surfaces of the unit cells 110 face each other, as illustrated in FIGS. 1 and 2. The alignment direction of the unit cells 110 will hereinafter be defined as the first direction (X). Unit cells 110 may be disposed or end supports 120 may be disposed at both ends of the cell stack.

The number of unit cells 110 constituting the cell stack 100 may be different in various embodiments that are contemplated herein. In some embodiments, the number of unit cells 110 constituting the cell stack 100 may be varied. The unit cells 110 included in one cell stack 100 may be electrically interconnected, for example using various suitable types of bus bars and/or the like.

The cell stack 100 may include an insulating member (e.g., an insulator) 112 around (e.g., surrounding) the plurality of unit cells 110. The insulating member 112 is formed of an insulating material such as rubber, plastic, or the like, and may be around (e.g., may surround) the plurality of unit cells 110.

The insulating member 112 may, in some embodiments, also be provided to surround end supports 120 disposed at both ends of the cell stack 100 in the first direction X together with the plurality of unit cells 110, if necessary, and may, in some embodiments, be around (e.g., surround) the plurality of unit cells 110 but not the end supports 120 and the end supports 120 may be separately disposed at both ends of the cell stack 100.

The insulating member 112 may be in a film form or may also have a plurality of plate-shaped configurations having rigidity. The insulating member 112 may be in the form around (e.g., surrounding) all four side surfaces of the cell stack 100 or may be disposed only at a portion of the four side surfaces, and may also be around (e.g., surround) both the upper surface and the lower surface of the cell stack 100. However, the insulating member 112 disposed on the upper surface of the cell stack 100 may expose the terminal part of each of the unit cells 110.

In FIG. 1, illustrates the insulating member 112 having the form of an insulating film and provided around (e.g., to surround) the side surfaces of the plurality of unit cells 110 but not the end supports 120 in the cell stack 100.

The module housing 200 includes a plurality of receiving parts 220 into which the cell stacks 100 are each inserted. FIG. 1 illustrates four receiving parts 220, and FIG. 2 separately illustrates two receiving parts 220 in the module housing 200 illustrated in FIG. 1. In other embodiments, other numbers of receiving parts 220 may be formed (e.g., located) in the module housing 200.

The module housing 200 has an outer wall 210 protruding upwardly from a bottom surface 260 and around (e.g., surrounding) the bottom surface 260, and an inner space defined by (e.g., surrounded by) the outer wall 210. The plurality of receiving parts 220 may be formed in the inner space.

The module housing 200 may have various suitable shapes, and the module housing 200 according to an exemplary embodiment of the present disclosure may have a bottom surface 260 of a substantially rectangular shape as illustrated in FIGS. 1 and 2.

The module housing 200 may be in the form in which an upper portion thereof is opened, and accordingly, the receiving part 220 formed in the module housing 200 may also be provided in the form in which an upper portion thereof is opened. A module cover may be coupled to and seal (or configured to be coupled to and seal) the opened upper surface of the module housing 200, and in a case in which the module cover is coupled to the module housing 200, the module cover may correspond to an upper surface of the receiving part 220. The module cover may include a bus bar holder for covering the cell stack 100, and bus bars arranged in the bus bar holder to electrically connect the unit cells 110 constituting the cell stack 100.

FIGS. 1 and 2 illustrate the receiving part 220 according to an exemplary embodiment of the present disclosure. The receiving part 220 includes a fixing wall around (e.g., surrounding) the cell stack 100 and having at least a portion which is in contact with the cell stack 100.

Referring to FIG. 1, a figure in which a receiving part 220 into which the cell stack 100 is inserted and a receiving part 220 into which the cell stack 100 is not inserted are disposed in parallel to each other is illustrated. The fixing wall 250 corresponds to a boundary wall around (e.g., surrounding) a region of the receiving part 220, and the cell stack 100 inserted into the receiving part 220 stably maintains a fixed state in which all sides of the cell stack 100 except for top and bottom are surrounded by the fixing wall 250.

In different embodiments, the fixing wall 250 may be variously disposed or arranged according to the form of the cell stack 100. In some embodiments, the fixing wall 250 may be around (e.g., surround) the cell stack 100 while having four surfaces facing and supporting side surfaces in four directions of the cell stack 100 as illustrated in FIG. 1.

At least a portion of the fixing wall 250 of the receiving part 220 may be in direct contact with the cell stack 100. For example, any one of the surfaces of the fixing wall 250 positioned in the first direction X may also be in direct contact with the cell stack 100, and any one of the surfaces of the fixing wall 250 positioned in the second direction Y perpendicular to the first direction X may also be in direct contact with the side surfaces of the plurality of unit cells 110 or, for example, the insulating member 112.

The second direction Y may be defined as a direction perpendicular to the first direction X on the same plane as the first direction X as illustrated in FIG. 1, and may be defined as a width direction of the unit cell 110.

As described above, according to an exemplary embodiment of the present disclosure, even though the cell stack 100 may not include a separate component, the cell stack 100 may maintain a shape thereof by the fixing wall 250 (e.g., the fixing wall 250 may maintain the shape of the cell stack 100) and may maintain an engaged state (e.g., a state in which the fixing wall 250 applies pressure to the cell stack 100) in the first direction (X).

In the case of a related art battery module, a module frame may be coupled to one cell stack, and one cell stack to which the module frame is coupled and which is handled as a unit configuration configures one module.

A related art cell stack to be handled may generally be coupled to a related art module frame for performance reasons such as energy density and ease of handling. The related art module frame may include end blocks pressuring (or pressing) both ends of the cell stack and side plates extending alongside surfaces of the cell stack, and the end blocks and the side plates may be coupled to each other in a state in which the cell stack is pressured (or pressed), thereby making it possible to maintain the structure of the cell stack 100.

In a related art battery module, the cell stack to which the module frame is coupled is inserted into the module frame, and the module housing and the module frame are fastened to each other.

Such a related art battery module may have to be provided with a plurality of other battery modules in order to meet power demands higher than available from one cell stack, and accordingly, a module frame for fastening the cell stacks as a unit body and a plurality of components constituting the module itself may be required.

Therefore, in a case in which the related art battery module is used in an electric energy consuming device requiring high power such as an electric vehicle, a process for manufacturing the battery module may be complicated, the consumption for the components may be increased, a weight of the battery module may be increased, and the time and cost required for manufacturing the battery module may be increased.

The battery module 1000 according to an exemplary embodiment of the present disclosure may meet a high power demand because the plurality of cell stacks 100 are mounted in one module, and because the cell stack 100 is fixed by the fixing wall 250 of the receiving part 220, not the outer wall 210 of the module housing 200 (e.g., not directly the outer wall 210, and/or not exclusively the outer wall 210), a component for fixing the cell stack 100 such as a module frame is not separately required.

That is, as illustrated in FIGS. 1 and 2, in an exemplary embodiment according to the present disclosure, the plurality of receiving parts 220 exist in one module housing 200, and the fixing wall (or fixing walls) 250 around (e.g., surrounding) the receiving parts 220 are provided to surround and fix each cell stack 100, rather than the outer wall 210 of the module housing 200.

In some embodiments of the battery module 1000 according to the present disclosure, side surfaces of the cell stack 100 at both sides in the second direction Y perpendicular to the first direction X may be in direct contact with the fixing wall 250.

The side surfaces of the cell stack 100 refer to both side surfaces extending in the first direction X, and as described above, because the cell stack 100 according to the present disclosure may not include a separate module frame, the side surfaces may correspond to the insulating member 112. Therefore, the surfaces of the fixing walls 250 around (e.g., surrounding) the receiving parts 220 facing the side surfaces of the cell stacks 100 inserted into the corresponding receiving parts 220 are in direct contact with the side surfaces to support the respective cell stacks 100 in the second direction Y.

As illustrated in FIG. 2, the module housing 200 may further include a separation wall 230 extending in the first direction X and contributing to form the plurality of receiving parts 220 by partitioning the inner space surrounded by the outer wall 210, and the separation wall 230 may correspond to a portion of the respective fixing walls 250 of two receiving parts 220 disposed at both sides along the second direction Y, and may be in contact with the side surfaces of the cell stacks 100 inserted into the two receiving parts 220, respectively.

The separation wall 230 may protrude upwardly from a bottom surface 260 of the module housing 200, and may divide the inner space of the module housing 200 while extending along the first direction X. That is, the separation wall 230 may correspond to a portion of the fixing wall 250 around (or surrounding) the receiving part 220, e.g., the separation wall 230 may be one surface of the fixing wall 250.

Referring to FIGS. 1 and 2, the receiving parts 220 may be located (e.g., formed) at both sides of the separation wall 230, and the separation wall 230 may become the fixing wall 250 for the two receiving parts 220 located (e.g., formed) at both sides thereof. That is, the two receiving parts 220 share the separation wall 230 existing therebetween as a portion of their respective fixing walls 250.

Referring to FIG. 2, the separation wall 230 faces the side surfaces of the cell stack 100 inserted into the receiving part 220, and accordingly, the separation wall 230 corresponding to a portion of the fixing wall 250 is in direct contact with at least a portion of the side surfaces of the cell stack 100 inserted into the receiving part 220 to thereby support the cell stack 100 in the second direction Y.

As illustrated in FIGS. 1 and 2, in an exemplary embodiment of the present disclosure, the module housing 200 further includes an end wall 240 extending in the second direction Y and disposed in (e.g., facing) the first direction X of each of the plurality of receiving parts 220 to engage (e.g., pressure, press, apply pressure to, and/or apply frictional pressure to) end surfaces of both sides of the cell stack 100 in the first direction X, and the end wall 240 may correspond to a portion of the fixing wall 250.

In the present disclosure, the end surfaces of the cell stack 100 are the sides of the cell stack 100 facing along the axis in the first direction X. According to embodiments of the present disclosure, the end surface may correspond to the insulating member 112 or may correspond to the end support 120.

FIGS. 1 and 2 illustrate an embodiment in which the end walls 240 are disposed at both sides of the cell stack 100 in the first direction X. That is, a plurality of end walls 240 may exist in the module housing 200 and may correspond to both side surfaces of the fixing wall 250 of the receiving part 220 facing along the axis in the first direction X.

The end wall 240 may be distinguished from the outer wall 210 of the module housing 200. For example, the end wall 240 may protrude from the bottom surface 260 of the module housing 200 and may extend in the second direction Y to cross the inner space of the module housing 200, and a plurality of end walls 240 may be spaced apart from the outer wall 210 facing one surface.

FIG. 1 illustrates a figure in which a plurality of receiving parts 220, for example a total of four receiving parts 220, are provided in two rows in the first direction X and two rows in the second direction Y, with one separation wall 230 that extends the entirety of the first direction X in the inner space of the module housing 200 (in some embodiments, with a gap for an impact absorbing space, discussed further below) and four end walls 240 that extend the entirety of the receiving part 220 in the second direction Y are provided.

The separation wall 230 is shared by the receiving parts 220 disposed at both sides in the second direction Y, and one receiving part 220 includes a half of a full length of the end wall 240

In addition, in some embodiments, the end walls 240 are not shared between receiving parts 220 at both sides of the receiving parts 220 in the first direction X, and the respective end walls 240 are spaced apart from each other on one surface facing each other in the first direction X.

That is, the end wall 240 may be disposed so that one surface thereof is in contact with the end surface of the cell stack 100 inserted into the corresponding receiving part 220 and the other surface thereof is either spaced apart from the outer wall 210, facing the outer wall 210, or spaced apart from an end wall 240 of another receiving part 220 disposed to be parallel in the first direction X.

A pair of end walls 240 disposed at both sides of the receiving part 220 in the first direction X may have at least a portion which is in direct contact with the end surfaces of the cell stacks 100 facing each other. In addition, the end wall 240 may engage (e.g., pressure, press, apply pressure to, and/or apply frictional pressure to) the cell stack 100 in the first direction X.

As described above, in an exemplary embodiment of the present disclosure, the cell stack 100 inserted into the receiving part 220 is not fastened to the module frame such as the end block or the side plate, and may be provided in the form in which the side surfaces thereof are surrounded by the insulating member 112 in a state in which the plurality of unit cells 110 are only aligned, and in the battery module 1000 according to an exemplary embodiment of the present disclosure, the end walls 240 may engage and fix the cell stack 100 in the first direction X.

The cell stack 100 may be engaged in the first direction X to provide higher power under the same volume, and is maintained in a structurally stable state.

The cell stack 100 may be inserted between the fixing walls 250 of the receiving part 220, particularly, between a pair of end walls 240 provided at both sides in the first direction X, in an engaged state (e.g., a state in which the cell stack 100 is pressed or under pressure) by a jig inserted into the receiving part 220 in a state in which the end surface is pressed, pressurized or engaged.

In an exemplary embodiment of the present disclosure, the fixing wall 250 of any one of the receiving parts 220 may be defined as including the separation wall 230, the pair of end walls 240, and a portion of the outer wall 210, and the separation wall 230 and the end walls 240 may be formed integrally (e.g., as a single, integral part) through a casting process or the like.

In addition, as illustrated in FIG. 2, in an exemplary embodiment of the present disclosure, one surface of the four surfaces of the fixing wall 250 may correspond to the separation wall 230, two other surfaces may correspond to the end walls 240, respectively, and the remaining surface may correspond to the outer wall 210 of the module housing 200.

In the battery module 1000 according to an exemplary embodiment of the present disclosure, the module housing 200 may have the bottom surface 260 formed integrally (e.g., as a single, integral part) with the end walls 240, the separation wall 230, and/or the outer wall 210, for example, through a casting process.

That is, in an exemplary embodiment of the present disclosure, the end walls 240 and the separation wall 230 may be formed integrally with the module housing, and openings (e.g., intaglios) of the end wall 240 and the separation wall 230 may be integrally formed in the mold when the mold is manufactured for the casting process.

In addition, in an exemplary embodiment of the present disclosure, the end walls 240 and the separation wall 230 may be formed integrally with the outer wall 210 of the module housing 200. In this case, the outer wall 210, the separation wall 230, the end walls 240, and the bottom surface 260 of the module housing 200 may be all manufactured integrally.

In the module housing 200 in which the end wall 240 and the separation wall 230 are integrally formed as described above, the manufacturing process of separately including the end wall 240 and the separation wall 230 as the components may be omitted, and the plurality of unit cells 110 of the cell stack 100 according to the present disclosure may be stably fixed in the receiving part 220 in the engaged state.

As illustrated in FIG. 2, in some embodiments, some of the plurality of end walls 240 are spaced apart from the outer wall 210 of the module housing 200 in the first direction X.

In an exemplary embodiment of the present disclosure, the end wall 240 having one surface facing the outer wall 210 of the module housing 200 is spaced apart from the outer wall 210 along the first direction X, thereby forming or making it possible to form a first impact absorbing space 215 between the outer wall 210 and the end wall 240.

In an exemplary embodiment of the present disclosure, a plurality of end walls 240 may be provided, and an end wall 240 facing the outer wall 210 among the plurality of end walls 240 may be spaced apart from the outer wall 210 of the module housing 200 facing the end wall 240 in the first direction X, thereby forming or making it possible to form the first impact absorbing space 215 between the outer wall 210 of the module housing 200 and the end wall 240.

FIG. 2 illustrates the end wall 240 facing the outer wall 210 of the module housing 200 among the end walls 240 constituting a portion (e.g., a side) of the fixing wall 250 of the receiving part 220, and the first impact absorbing space 215 formed between the end wall 240 and the outer wall 210.

The module housing 200 may safely protect the cell stack 100 inserted into the receiving part 220 against impacts delivered from the outside, and in an exemplary embodiment of the present disclosure, the end wall 240 which is in direct contact with the end surface of the cell stack 100 to support and engage the cell stack 100 may be spaced apart from the outer wall 210 to prevent the impact delivered to the outer wall 210 from being delivered or directly delivered to the end wall 240.

Further, because the impact delivered from the outside of the module housing 200 may be delivered to the end wall 240 and the cell stack 100 in a state in which it is reduced by the first impact absorbing space 215, safety of the battery may be improved.

Further, the first impact absorbing space 215 may serve as a heat dissipating space in which the heat of the cell stack 100 is dissipated or dispersed.

In an exemplary embodiment of the present disclosure, as illustrated in FIG. 1, a plurality of receiving parts 220 may be disposed in the inner space of the module housing 200 along the first direction X, and in two receiving parts 220 adjacent to each other along the first direction X, the respective end walls 240 disposed facing each other in the first direction X may be spaced apart, thereby forming or making it possible to form a second impact absorbing space 216 between the end walls 240.

FIG. 1 illustrates the module housing 200 in which the four receiving parts 220 are formed according to an exemplary embodiment of the present disclosure, and wherein the receiving parts 220 are aligned in two rows along the first direction X. However, in other embodiments, the number of the receiving parts 220 aligned along the direction X may vary, and the present disclosure is not limited to embodiments providing two rows.

In two receiving parts 220 adjacent to each other in the first direction X, surfaces on which the respective fixing walls 250 face each other correspond to respective end walls 240 of the two receiving parts 220, and the two receiving parts 220 have different end walls 240 on surfaces facing each other. That is, the receiving parts 220 arranged in the first direction X do not share the end walls 240.

Referring to FIG. 2, between two receiving parts 220 aligned along the axis of the first direction X, it may be seen that the end walls 240 of the respective receiving parts 220 adjacent to and facing each other are spaced apart, and the second impact absorbing space 216 is formed between the respective end walls 240.

The second impact absorbing space 216 may protect the cell stack 100 inserted into the corresponding receiving part 220 from the impact delivered from the outside of the receiving part 220, in a similar manner as the first impact absorbing space 215. For example, the first impact absorbing space 215 may prevent an impact delivered to the outer wall 210 of the module housing 200 from being delivered to the inner space of the module housing 200, and the second impact absorbing space 216 may prevent an impact delivered to one of the receiving parts 220 from being delivered to the other receiving part 220 adjacent thereto in the first direction X.

As shown in FIG. 2, a plurality of first ribs 242 may be formed in the end wall 240 according to the exemplary embodiment of the present invention. The end wall 240 may include the plurality of first ribs 242 on the outer surface in the first direction X. The first ribs 242 may effectively improve strength of the end wall 240 and may be integrally formed with the end wall 240.

Figure 3:
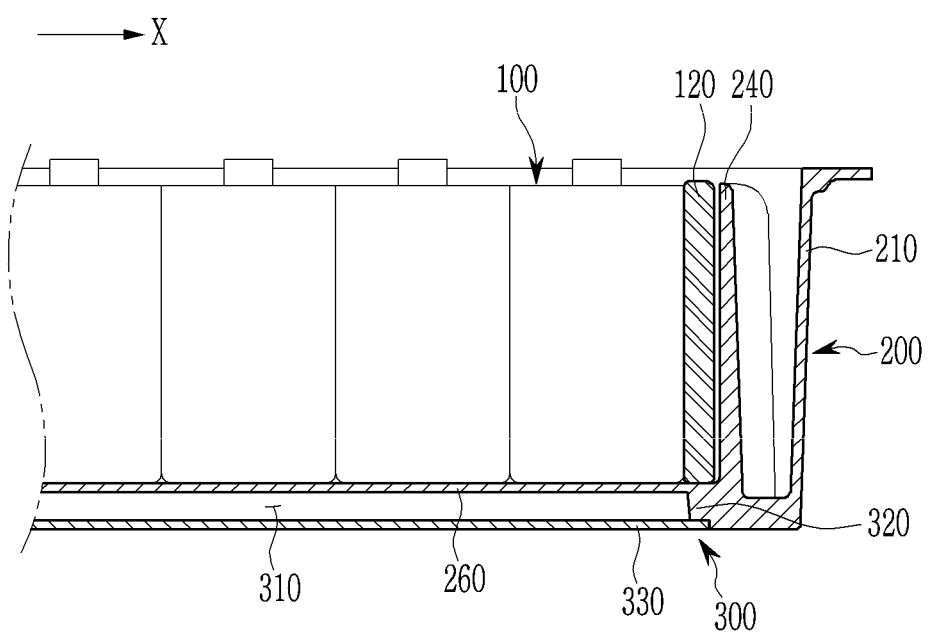
FIG. 3 is a view schematically illustrating a cooling channel in the battery module according to an exemplary embodiment of the present disclosure.
Figure 4:
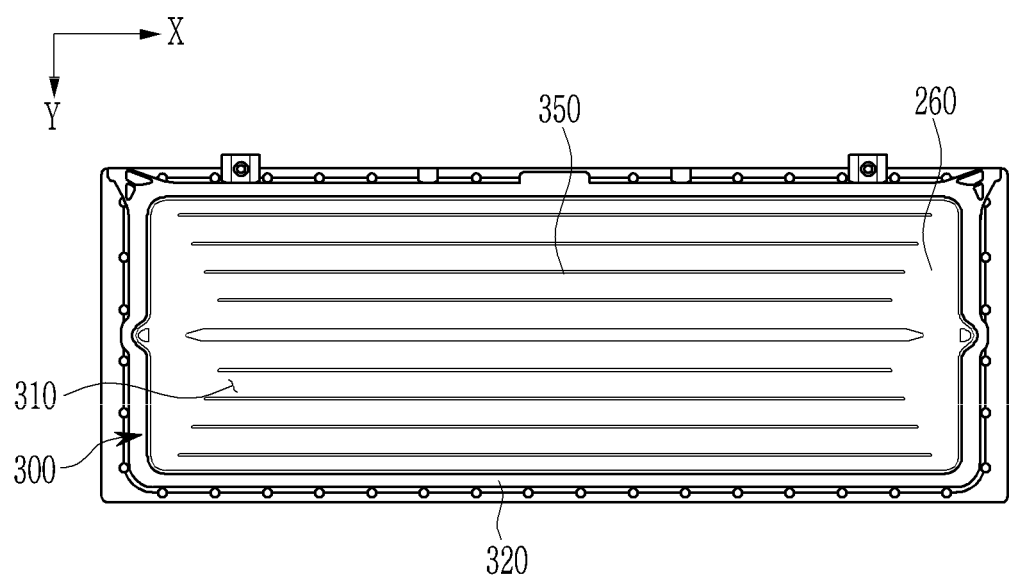
FIG. 4 is a bottom view of the cooling channel in the battery module according to an exemplary embodiment of the present disclosure.

FIG. 3 illustrates a cross section of the module housing 200 according to an exemplary embodiment of the present disclosure, in which a cooling channel 300 having a flowing space in which a coolant (e.g., a cooling medium, a cooling fluid or cooling water) flows is formed below the bottom surface 260. FIG. 4 illustrates a bottom view of the cooling channel 300.

As illustrated in FIG. 3, in the battery module 1000 according to an exemplary embodiment of the present disclosure, the cooling channel 300 through which the coolant flows may be formed below the bottom surface 260 of the module housing 200. In addition, a plurality of guide protrusions 350 extending in a flow direction of the coolant for guiding the flow of the coolant may be provided at a lower surface of the bottom surface 260 as illustrated in FIG. 4.

The flowing space 310 of the cooling channel 300 may be formed across the entirety of the bottom surface 260, or may also be formed to correspond to a cross sectional area of the inner space of the module housing 200 in which the receiving parts 220 are formed. For example, in some embodiments, the flowing space 310 of the cooling channel 300 does not exist below the first impact absorbing space 215. The coolant flows through the cooling channel 300, and in some embodiments, a refrigerant may additionally be used with the coolant or alternatively be used instead of the coolant.

The unit cells 110 constituting the cell stack 100 correspond to heating elements that dissipate heat during discharge, and in a case in which the temperature of the unit cells rises excessively, a thermal runaway phenomenon may occur where heat rapidly increases due to abrupt chemical reaction and fire or the like occurs.

In addition, in cases where a plurality of unit cells 110 are aligned in a cell stack 100 (such as in some embodiments of cell stack 100 according to the present disclosure), when the thermal runaway phenomenon occurs in any one of the unit cells 110, a thermal runaway diffusion phenomenon, which affects other peripheral unit cells 110, may also occur.

As described above, when the plurality of unit cells 110 are disposed in a cell stack 100, it is desirable or important to adequately cool the heat generated in the cell stack 100, and accordingly, the battery module 1000 according to an exemplary embodiment of the present disclosure efficiently implements the cooling of the plurality of cell stacks 100 by forming the cooling channel 300 below the bottom surface 260 of the module housing 200.

In addition, in an exemplary embodiment of the present disclosure, the maintenance and management of the cooling channel 300 may be more easily performed by forming the cooling channel 300 below the bottom surface 260 of the module housing 200 rather than the inside of the module housing 200, that is, the inner space and the partitioned space of the module housing 200 (e.g., inside the inner space formed inside the outer wall 210). For example, according to an exemplary embodiment of the present disclosure, maintenance and management of the cooling channel 300 at the lower portion of the module housing 200 is possible even in a state in which a module cover of the module housing 200 is assembled (e.g., attached or fixed to the module housing 200 to seal the open upper surface of the module housing 200).

In the battery module 1000 according to an exemplary embodiment of the present disclosure, side walls 320 of the cooling channel 300 may be formed integrally (e.g., as a single, integral part) with the bottom surface 260 of the module housing 200, such as through a casting process.

The side walls 320 of the cooling channel 300 may be around (e.g., surround) the bottom surface 260 and may protrude downward from the bottom surface 260. For example, in an exemplary embodiment of the present disclosure, because the side wall 320 of the cooling channel 300 is formed integrally with the bottom surface 260 of the module housing 200 through the casting process, a coupled portion between the side wall 320 and the bottom surface 260 does not exist, and accordingly, a situation in which the coolant leaks unintentionally into the module housing 200 may be prevented or substantially prevented in advance.

A channel cover 330 sealing the cooling channel 300 may be coupled to a lower end of the side wall 320 of the cooling channel 300, such as by welding or the like. FIG. 4 illustrates a bottom view of the cooling channel 300 in a state in which the channel cover 330 is removed.

In an exemplary embodiment of the present disclosure, the outer wall 210, the bottom surface 260 of the module housing 200, and the side wall 320 of the cooling channel 300 are all formed integrally, such as through a casting process, such that there is no portion through which the coolant may leak, including into the portion of the module housing 200 containing the cell stack(s) 100.

Further, because the cooling channel 300 is provided below the bottom surface 260 of the module housing 200, even in the event that coolant unintentionally leaks from the cooling channel 300, it is unlikely that the coolant permeates into the inner space of the module housing 200 in which the cell stack 100 exists.

As a result, according to an exemplary embodiment of the present disclosure, because the plurality of cell stacks 100 are inserted, the assembly process and components may be simplified, the high power demand may be effectively satisfied, the plurality of cell stacks 100 may be effectively cooled through the cooling channel 300, and the plurality of cells stacks 100 may be effective protected from a leakage phenomenon of the coolant from the cooling channel 300.

Figure 5:
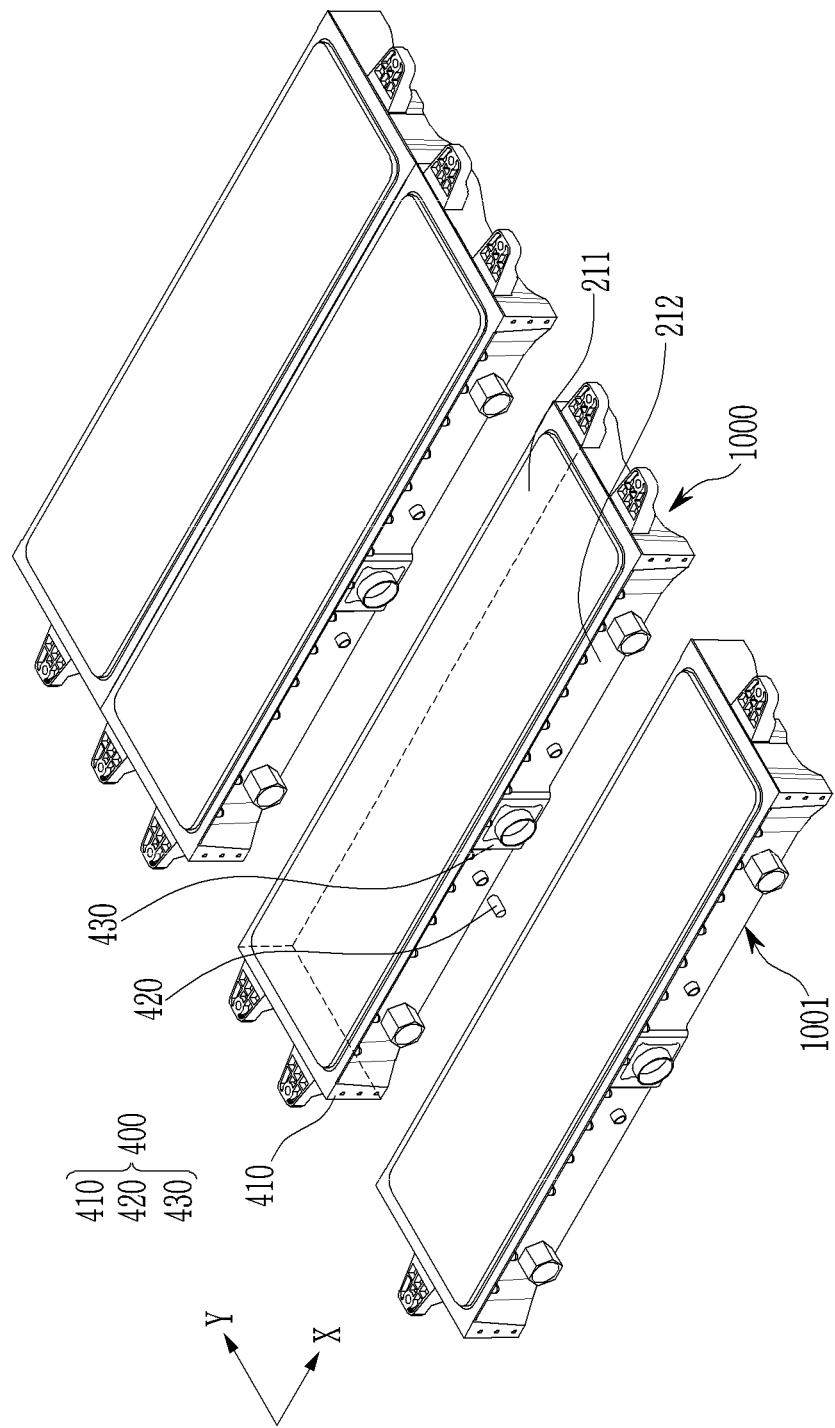
FIG. 5 is a view illustrating a figure in which battery modules according to an exemplary embodiment of the present disclosure are coupled to each other.

FIG. 5 illustrates a figure in which a plurality of battery modules according to an exemplary embodiment of the present disclosure are provided and are interconnected. That is, FIG. 5 illustrates a figure in which the battery modules 1000 are coupled to each other to form a large pack (e.g., a battery pack).

As illustrated in FIG. 5, the battery module 1000 according to an exemplary embodiment of the present disclosure may further include a coupling part 400 provided in and/or on the module housing 200 and coupled to the adjacent module housing 1001.

According to the described embodiment of the present disclosure, the module housing 200 has the plurality of receiving parts 220 in which the plurality of cell stacks 100 are provided, thereby effectively implementing a high output. In some cases, a power demand required by an electric energy consuming device may exceed even the increased output provided by the battery module 1000 according to embodiments of the present disclosure.

The battery modules 1000 may be coupled to each other to meet the power demand, thereby making it possible to realize a large pack structure, and FIG. 5 illustrates a figure in which the coupling parts 400 are formed on one surface of the module housing 200 and the coupling parts 400 between the battery modules 1000 adjacent to each other are coupled to each other.

The coupling part 400 may have one of various types and shapes, and in FIG. 5, the coupling part may include fastening parts 410 fastened to each other through a fastening member, guide parts 420 aligning positions of the respective fastening parts 410 of the corresponding battery module 1000 and the adjacent battery module, and connection parts 430, which are connection passages of the bus bar for electrical connection with the adjacent module housing 1001.

As illustrated in FIG. 5, in the battery module 1000 according to an exemplary embodiment of the present disclosure, the coupling parts 400 may be provided on the first wall 211 and the second wall 212 of the outer wall 210 of the module housing 200, positioned facing the second direction Y, and the coupling part 400 provided on the second wall 212 of the module housing 200 may be coupled to the coupling part 400 provided on the first wall 211 of the module housing 1001.

The coupling part 400 may be provided in and/or on the module housing 200, and may be disposed on the outer wall 210 of the module housing 200 as illustrated in FIG. 5. For example, in the battery module 1000 according an exemplary embodiment of the present disclosure, because the plurality of cell stacks 100 are inserted thereinto and the cell stacks 100 include the plurality of unit cells 110 aligned in the first direction X, the module housing 200 may have a cross section of a rectangular shape having a longer length in the first direction X.

Accordingly, even though the plurality of module housings 200 are aligned and coupled in series with each other through the coupling parts 400, in an exemplary embodiment of the present disclosure, the coupling parts 400 may be disposed on the first wall 211 and the second wall 212 facing in the second direction Y among the outer walls 210 of the module housing 200 so that an entire length of the plurality of module housings 200 may be reduced. However, a shape of a cross section of the module housing 200, a position on the outer wall 210 on which the coupling part 400 is disposed, and the like are not necessarily limited thereto.

Accordingly, the coupling part 400 disposed on the first wall 211 of any one of the module housings 200 may be coupled to the coupling part 400 disposed on the second wall 212 of the other of the module housings facing the first wall 211, and the coupling part 400 disposed on the second wall 212 of any one of the module housings 200 may be coupled to the coupling part 400 disposed on the first wall 211 of the other of the module housings 1001 facing the second wall 212.

The coupling part 400 disposed on the first wall 211 of the outer wall 210 of the module housing 200 may be inserted into and coupled to the coupling part 400 disposed on the second wall 212 of the adjacent module housing 1001. For example, the fastening part 410, a guide pin of the guide part 420, and the connection tunnel of the connection part 430 may be disposed on the first wall 211.

In addition, the coupling part 400 disposed on the second wall 212 may have a configuration in which it is inserted into and coupled to the coupling part 400 of the adjacent module housing 1001. For example, the fastening part 410, the guide groove of the guide part 420, and the tunnel insertion hole of the connection part 430 may be disposed on the second wall 212. However, an insertion relationship and the respective components of the coupling part 400 disposed on the first wall 211 and the second wall 212 are not necessarily limited thereto.

Figure 6:
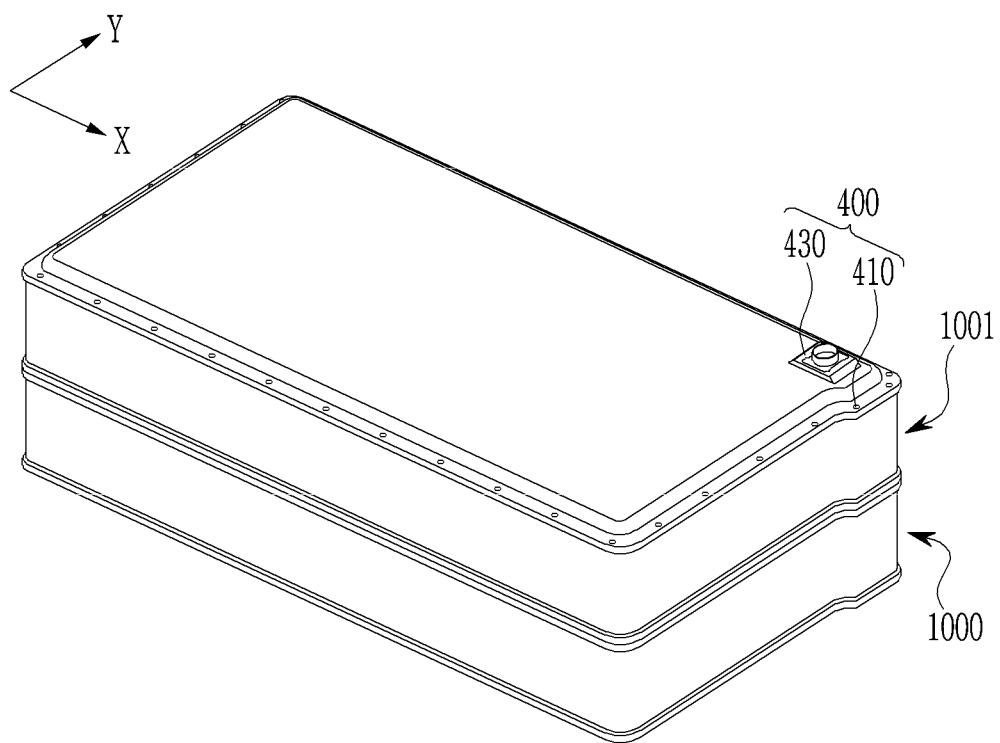
FIG. 6 is a view illustrating a figure in which battery modules according to another exemplary embodiment of the present disclosure are coupled to each other.

FIG. 6 illustrates a figure in which a plurality of battery modules according to another exemplary embodiment of the present disclosure are provided and are interconnected. That is, FIG. 6 illustrates a figure in which the battery modules are coupled to each other to form a large pack (e.g., a battery pack).

As shown in FIG. 6, the coupling parts 400 are formed on the upper surface (or module cover) and the bottom surface of the battery module, and the coupling parts 400 between the battery modules adjacent to each other are coupled to each other. Accordingly, the plurality of battery modules may be stacked in the vertical direction (directions perpendicular to the first direction X and the second direction Y) through the coupling parts 400.

For example, the connection part 430 disposed on the upper surface of the battery module 1000 may be inserted into the connection part 430 disposed on the bottom surface of the adjacent battery module 1001. In addition, the connection parts 430 may be connection passages of the bus bar for electrical connection with the adjacent battery modules.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
| --- | --- |
| 100: cell stack | 110: unit cell |
| 120: end support | 200: module housing |
| 210: outer wall of module housing | 211: first wall |
| 212: second wall | 215: first impact absorbing space |
| 216: second impact absorbing space | 220: receiving part |
| 230: separation wall | 240: end wall |
| 250: fixing wall | 260: bottom surface of module housing |
| 300: cooling channel | 310: flowing space |
| 320: side wall of cooling channel | 330: channel cover |
| 350: guide protrusion | 400: coupling part |
| 410: fastening part | 420: guide part |
| 430: connection part | 1000: battery module |

What is claimed is:

1. A battery module comprising:
a cell stack comprising a plurality of unit cells aligned in a first direction and an insulating member around the plurality of unit cells; and
a module housing having a plurality of receiving parts, the cell stack being in one of the plurality of receiving parts,
wherein one of the plurality of receiving parts comprises a fixing wall around the cell stack, wherein the fixing wall comprises end walls, and a separation wall in contact with the insulating member of the cell stack, wherein the separation wall extends in the first direction and the end walls extend in a second direction perpendicular to the first direction,
wherein the module housing comprises a bottom surface, an outer wall around the bottom surface, and the end walls in an inner space defined by the outer wall, and
wherein the bottom surface, the outer wall, the end walls, and the separation wall are integrally formed.

2. The battery module of claim 1, wherein:
the separation wall partitions the inner space defined by the outer wall of the module housing to form the plurality of receiving parts,
first and second receiving parts of the plurality of receiving parts are at opposite sides of the separation wall in the second direction perpendicular to the first direction, and
the separation wall corresponds to a portion of the fixing wall of each of the first and second receiving parts and is in contact with a side surface of the cell stack.

3. The battery module of claim 2, wherein:
the end walls are at respective sides of each of the plurality of receiving parts in the first direction to engage end surfaces at respective sides of the cell stack in the first direction.

4. The battery module of claim 3, wherein:
one surface of the end walls faces the outer wall of the module housing and is spaced apart from the outer wall along the first direction to form a first impact absorbing space between the end wall and the outer wall.

5. The battery module of claim 3, wherein:
the plurality of receiving parts are in the inner space of the module housing, the first receiving part and a third receiving part are adjacent to each other along the first direction, and the end walls of the first and third receiving parts facing in the first direction and between the first and third receiving parts are spaced apart from each other to form a second impact absorbing space between the end walls.

6. The battery module of claim 1, further comprising a cooling channel for a coolant to flow through, the cooling channel being located below the bottom surface of the module housing.

7. The battery module of claim 6, wherein:
a side wall of the cooling channel is integral with the bottom surface of the module housing.

8. The battery module of claim 1, further comprising:
coupling parts configured to couple the module housing to an adjacent module housing.

9. The battery module of claim 8, wherein:
the coupling parts are on a first wall and a second wall of an outer wall of the module housing that are positioned in the second direction perpendicular to the first direction, and
one of the coupling parts on the second wall of the module housing is coupled to another one of the coupling parts on a first wall of an adjacent module housing.

10. A battery pack comprising:
a plurality of modules, each module of the plurality of modules comprising:
a cell stack comprising a plurality of unit cells aligned in a first direction and an insulating member around the plurality of unit cells; and
a module housing having a plurality of receiving parts, the cell stack being in one of the plurality of receiving parts,
wherein the one of the plurality of receiving parts comprises a fixing wall around the cell stack and having at least a first portion in contact with the cell stack,
wherein a cooling channel for a coolant to flow through is located below a bottom surface of the module housing rather than inside the fixing wall,
wherein the module housing comprises the bottom surface, an outer wall around the bottom surface, end walls extending in a second direction perpendicular to the first direction in an inner space defined by the outer wall, and a separation wall extending between the end walls in the first direction,
wherein one of the end walls corresponds to a second portion of the fixing wall,
wherein one surface of the one of the end walls faces the outer wall of the module housing and is spaced apart from the outer wall along the first direction to form a first impact absorbing space between the end wall and the outer wall, and
wherein the end walls, the separation wall, and the outer wall of the module housing are integral with the bottom surface of the module housing.

11. The battery pack of claim 10, wherein:

the separation wall partitions the inner space defined by the outer wall of the module housing to form the plurality of receiving parts, first and second receiving parts of the plurality of receiving parts are at opposite sides of the separation wall in the second direction perpendicular to the first direction, and the separation wall corresponds to a third portion of the fixing wall of each of the first and second receiving parts and is in contact with a side surface of the cell stack.

12. The battery pack of claim 11, wherein:

the end walls are at respective sides of each of the plurality of receiving parts in the first direction to engage end surfaces at respective sides of the cell stack in the first direction.

13. The battery pack of claim 12, wherein:

the plurality of receiving parts are in the inner space of the module housing, the first receiving part and a third receiving part are adjacent to each other along the first direction, and the end walls of the first and third receiving parts facing in the first direction and between the first and third receiving parts are spaced apart from each other to form a second impact absorbing space between the end walls.

14. The battery pack of claim 10, wherein:

a side wall of the cooling channel is integral with the bottom surface of the module housing.

15. The battery pack of claim 10, further comprising:

coupling parts configured to couple the module housing of the module to a module housing of an adjacent module of the plurality of modules.

16. The battery pack of claim 15, wherein:

the coupling parts are on a first wall and a second wall of the outer wall of the module housing that are positioned in the second direction perpendicular to the first direction, and one of the coupling parts on the second wall of the module housing is coupled to another one of the coupling parts on a first wall of an adjacent module housing of the adjacent module.

* * * * *